US011200531B1

(12) United States Patent
Brady et al.

(10) Patent No.: US 11,200,531 B1
(45) Date of Patent: Dec. 14, 2021

(54) SELF-IDENTIFYING OVERPACKAGE FOR ROBOTIC RETRIEVAL

(71) Applicant: Amazon Technologies, Inc., Seattle, WA (US)

(72) Inventors: Tye Michael Brady, Southborough, MA (US); John Gregory Longtine, Sudbury, MA (US); Timothy Stallman, Groton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 673 days.

(21) Appl. No.: 15/978,762

(22) Filed: May 14, 2018

(51) Int. Cl.
| | | |
|---|---|---|
| *G06Q 30/00* | (2012.01) | |
| *G06Q 10/08* | (2012.01) | |
| *G06K 7/14* | (2006.01) | |
| *B65G 1/137* | (2006.01) | |
| *G06Q 50/28* | (2012.01) | |
| *B25J 15/06* | (2006.01) | |

(52) U.S. Cl.
CPC .......... *G06Q 10/083* (2013.01); *B65G 1/137* (2013.01); *G06K 7/1417* (2013.01); *G06Q 50/28* (2013.01); *B25J 15/06* (2013.01); *B25J 15/0608* (2013.01)

(58) Field of Classification Search
CPC .............................. G06Q 10/083; B65Q 1/137
USPC ......................................................... 705/330
See application file for complete search history.

(56) References Cited

U.S. PATENT DOCUMENTS

| | | | | |
|---|---|---|---|---|
| 10,583,560 | B1 * | 3/2020 | Rodrigues | .............. B25J 9/1697 |
| 10,751,882 | B1 * | 8/2020 | Brady | .................... B25J 9/1653 |
| 2018/0068139 | A1 * | 3/2018 | Aalund | ..................... G06K 9/20 |
| 2018/0162642 | A1 * | 6/2018 | Schneider | .............. B65G 1/137 |
| 2020/0184542 | A1 * | 6/2020 | Welty | ................. G06Q 30/0208 |

OTHER PUBLICATIONS

Olson, Edwin. AprilTag: A robust and flexible visual fiducial system. Proceedings of the IEEE International Conference on Robotics and Automation (ICRA), May 2011.

\* cited by examiner

*Primary Examiner* — Ahshik Kim
(74) *Attorney, Agent, or Firm* — Knobbe Martens Olson & Bear, LLP

(57) ABSTRACT

Features are disclosed for an overpackage that can contain an object and provide for automated identification and handling of the object by a robotic retrieval system. The automated identification and handling are enabled through self-identifying marks on the overpackage that indicate the identity of the overpackage as well as the relative location of the mark on the overpackage. Using the location information, a robot or other autonomous actor of the robotic retrieval system can identify a path to a pick point and detect whether the proper pick point is engaged through additional identifiers on the overpackage or a pick point.

20 Claims, 6 Drawing Sheets

SELF-IDENTIFYING OVERPACKAGE FOR ROBOTIC RETRIEVAL

CROSS-REFERENCE TO RELATED APPLICATION(S)

This application is related to U.S. patent application Ser. No. 15/978,995 filed on May 14, 2018, entitled "END EFFECTOR FOR AUTONOMOUS OBJECT RETREIVAL" which is hereby expressly incorporated by reference in its entirety.

BACKGROUND

Robotic solutions capable of identifying and manipulating high volumes of objects may be included to automate fulfillment processes, such as picking an object from a receptacle, stowing an object within a receptacle, decanting an object, and packing an object for transfer to a new location (e.g., shipping to a recipient).

One barrier in achieving such a robotic solution is in the enormous variation present in the various objects that may be processed by the system. It is tremendously difficult for robots and automated solutions to physically manipulate each object, due in part to different shapes of the objects, different packaging material for the objects, different weights of the objects, or other physical characteristics that create uncertainty in identifying and grasping an object. The accuracy represents part of this barrier. Another aspect is speed. To provide advantages over existing object processing, manipulation of an object would need to be performed as fast, if not faster, than the existing processes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
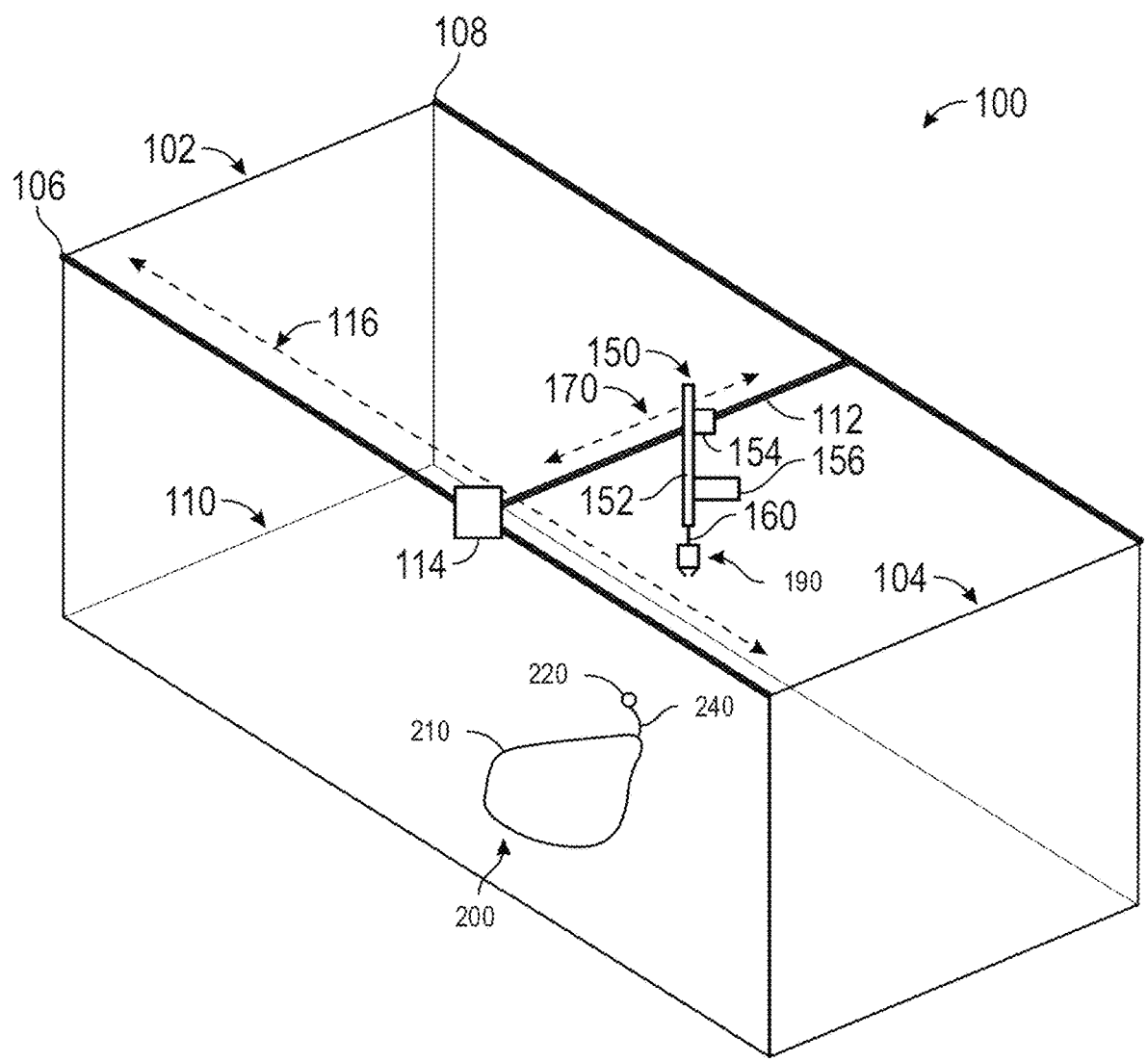
FIG. 1 is a block diagram showing an example robotic retrieval system capable of retrieving a self-identifying overpackage from stowage.

Within a fulfillment center, objects may be received for storage until such time as they are requested for delivery to a recipient or another fulfillment center. Objects of many different shapes and sizes may be processed through the fulfillment center. Objects may be processed by a robotic retrieval system. The robotic retrieval system may include autonomous actors such as robots or mobile drive units may be deployed within the fulfillment center to facilitate the processing of objects. However, the ability of any given autonomous actor to manipulate an object may be limited to its ability to identify the object as well as a manner of grasping the object in a way that does not damage the object.

The present disclosure is generally related to an overpackage that forms a handling unit for one or more objects in a fulfillment system. As described herein, the overpackage may include a self-identifying robotic handle, an enclosure for one or more objects, and one or more detectable identifiers on the overpackage. Using the detectable identifiers, an end effector of a robot or other autonomous actor may locate the overpackage in which an object of interest is stored. An end effector generally refers to a mechanism that can be positioned within a fulfillment center and activated to couple with the overpackage to move the object of interest to a destination location. As an example, the end effector may include a set of flanges supported by an outer body of the end effector. Each flange may pivot about the outer body and define a tip that, upon pivoting, secures a handle by pivoting toward a central point (e.g., the handle). The detectable identifiers may also provide guidance to position the end effector near the self-identifying robotic handle. Once near the handle, the end effector may engage the handle to create a coupling that allows the end effector to lift and move the overpackage to another location within the fulfillment system. The identifiers on the overpackage assist a robot or other automated actor in a fulfillment center to identify an object, orient the robot vis-a-vis the object (this may be referred to as "localizing to the object"), and grasp the object in a reliable and safe manner.

The overpackage may be an apparatus that includes features to increase discovery and manipulation of an object in addition to enveloping the object during processing. One such feature provides unique identification of a specific instance of an object enclosed in the overpackage. Using board games as an example, a specific instance of a board game would be a specific box containing a copy of the board game. An identifier for the board game may be associated with a unique identifier for an overpackage into which the board game will be placed. Once enclosed in the overpackage, this specific instance of the board game may be uniquely identified using an identifier placed at a particular geometry on the overpackage. The identifier may indicate data associated with the overpackage such as its unique identifier. For example, an AprilTag may be included for basic data about the overpackage that can be easily detected using an image of the overpackage taken from a distance. A QUICK RESPONSE™ (QR) code may be included to encode more extensive data about the overpackage and to provide more detailed localization information indicating where on the overpackage the code is located. A passive radiofrequency identification (RFID) tag or other passive wireless circuit may be included for identification of the overpackage through wireless signaling when line of sight, such as for optical scanning of QR codes or AprilTags, to the overpackage is occluded. Example features of AprilTags are described by Edwin Olson in "AprilTag: A Robust and Flexible Visual Fiducial System" Proceedings of the IEEE International Conference on Robotics and Automation (ICRA) (May 2011) which is incorporated by reference in its entirety.

The features also provide information about how and where a robot or other automated actor should grasp the overpackage. The grasping information can be embedded into identifiers on the overpackage. For example, QR codes, when viewed through a camera system, can produce a three-dimensional (3D) localization vector. The 3D localization vector may provide location information to orient the camera system to the overpackage. The camera system may be a sensor associated with a robotic end effector of the autonomous actor that will retrieve the overpackage. Because the 3D localization vector orients the end effector to the overpackage, the end effector may be accurately and quickly moved to engage with a specific portion of the overpackage such as a handle or other pick point. In some embodiments, the robotic end effector is a physical, electromechanical device, such as a robotic claw, that can be activated to attach to the overpackage and move the overpackage (and any object included therein) to a destination location such as a loading bay in the fulfillment center. In some implementations, the grasping information may be provided by referencing an end effector type that can interact with the overpackage.

Another obstacle to effective robotic retrieval of objects is the ability to effectively attach to the overpackage. One form of engagement with an overpackage may be to grasp the overpackage using a set of flanges. Objects without overpackaging can have non-uniform sizes making consistent identification of an appropriate attachment point a resource intensive activity for a robotic actor. To facilitate the attachment, the overpackage may preferably include structures that provide a consistent and reliable point for machine manipulation. Examples of structures for reliable machine attachment include a suction point on the overpackage, a protruding robotic pick point (e.g., a ball handle), or a location for hooking the overpackage (e.g., a grommet).

An overpackage may include redundant identifiers or attachment structures. Having redundant solutions allows for less defects per million objects (DPMO), more flexibility and real-time adjustments to different environments that the overpackage will encounter (e.g., unstructured storage, manipulation while moving, alternative storage options).

In one embodiment utilizing overpackages, a specific instance of an object may be placed inside an overpackage by a human or automated machine, assuring the right size overpackage has been selected based on physical characteristics of the object such as dimensions of the object or weight of the object. Once the object is enclosed within the overpackage, a record may be created associating the identifier for the object with the identifier for the overpackage. The attributes associated with the object (e.g., size, weight, object classifier, etc.) may be correlated (hand scanning of codes, optical scanning of codes, manual typing of code) with a unique overpackage identification number. The unique overpackage identification number may be encoded within visible QR codes associated with the overpackage. The overpackage structure and indicators thereon enables the overpackage to be both self-identifying and more easily graspable by autonomous systems.

Multiple different overpackages may be packed into a container (e.g., a tote) and moved into a robotic retrieval system where robotic arms and gantry like systems could automatically pick, sort, and move the enclosed objects from the container. Identification of an object may be achieved by reading the identifiers on the overpackage. The overpackage unique identifier can be used to identify the object identifier.

In some implementations, the identifier on the overpackage, such as a QR code, may provide a known optical pattern with known spacing that provides the robotic system with a highly accurate 3D vector from the sensing optical camera to the specific overpackage QR code. This allows for the associated robotic end effector to determine exactly where the overpackage is in order to manipulate the overpackage and thus the object enclosed within.

In some implementations, the overpackage may be formed of a material that is "robot suction friendly" such that a suction end effector can reliably place a suction point and inherently pick it up by drawing a vacuum within the suction cup. It may be desirable for overpackage to be at least partially formed of a transparent material or include a transparent portion to allow inspection of the enclosed object.

Suction is one example of how an attachment may be made with the overpackage. Some embodiments of the robotic grasping system may include features to pick up the overpackage such as using one or more robotic handles physically attached to the overpackage via a semi-rigid tether. The robotic grasping system may detect an identifier on the overpackage to obtain relative directions to from the self-identifying identifier to the location of the robotic handle. Using the directions, the robotic grasping system may maneuver itself near the robotic handle. The robotic handle may be implemented as a metallic multi-faced handle. The handle may also include scannable identifiers to facilitate further positioning of the robotic grasping system and attachment with the overpackage. Once in the general vicinity of the robotic handle, the robotic retrieval system may read various embedded or surface printed identifiers on the robotic handle to both confirm identity of the overpackage as the overpackage enclosing the object to be retrieved and also localize a vector to which the end effector can move.

Once near the robotic handle of the overpackage, the end effector of an autonomous actor included in the robotic retrieval system may activate to engage with the robotic handle. For example, the end effector may activate an electromagnet to produce a magnetic field. The magnetic field may attract the robotic handle to upwards (away from gravity) and into a grasping enclosure of the end effector. Once attracted upwards, the grasping enclosure that may secure around the robotic handle. This two-step grasping may save time as the robotic handle does not have to be precisely grasped such as by a set of two or three flanges which may be included in the end effector. In addition, if secured by the robotic handle, the robotic retrieval system may be configured to extract the overpackage from a pile of overpackages, even if the overpackage including the object of interest is located on the bottom of the pile. Once secured, the overpackage can be rapidly moved through the fulfillment center without worry about torsion issues due to lateral acceleration. For example, if an overpackage is loosely coupled to an end effector, if the end effector moves rapidly or abruptly changes directions, the momentum may dislodge the overpackage from the end effector. However, if secured, rapid movements or changes in direction should have minimal, if any, impact on the coupling between the end effector and the overpackage. This increases the rate at which overpackages can be moved throughout the fulfillment center.

Once the overpackage is in the grasp of the robotic end effector (e.g., by suction or robotic handle), the robotic system may move the overpackage to a destination location for further processing. The processing may include picking objects for an order, stowing objects in a location, or sorting objects being added to the fulfillment center. In some cases, these processes may be performed without human touch.

FIG. 1 is a block diagram showing an example robotic retrieval system 100 capable of retrieving a self-identifying overpackage from stowage. The robotic retrieval system 100 in FIG. 1 shows a gantry which includes a first support 102 and a second support 104 connected by a first lateral rail 106 and a second lateral rail 108. The gantry also includes a cross-rail 112 which is perpendicular to the first lateral rail 106 and the second lateral rail 108. The cross-rail 112 is coupled to the first lateral rail 106 and the second lateral rail 108 such that the cross-rail 112 can traverse an area 110 under the gantry to, for example, retrieve an object enclosed in an overpackage 200. The overpackage 200 may be self-identifying by including one or more indicators on its surface which can encode or otherwise convey information about the indicator (e.g., size, location on the overpackage 200) as well as the overpackage 200 (e.g., a unique identifier for the overpackage 200).

The cross-rail 112 may traverse the area 110 using a rail motor 114. The rail motor 114 may be driven to cause the cross-rail 112 to slide along the first lateral rail 106 and the second lateral rail 108. In some implementations, the cross-rail 112 may be driven using belts, electromagnetism, or other drivers. FIG. 1 shows the rail motor 114 coupled with the first lateral rail 106. In some implementations, the rail motor 114 may be coupled with the second lateral rail 108. In some implementations, the cross-rail 112 may be driven by a driver on both the first lateral rail 106 and the second lateral rail 108.

The rail motor 114 may be driven through command messages transmitted to the rail motor 114 from a controlling device. The command messages may form control signals that can be interpreted by the rail motor 114 or a controlling device. In some implementations, the controlling device may be included in a grasping mount 150.

The grasping mount 150 may be part of the robotic grasping system. The grasping mount 150 may be coupled with the cross-rail 112. The grasping mount 150 is moveably coupled with the cross-rail 112 to allow an end effector 190 to traverse the area 110 under the gantry. The grasping mount 150 may be driven along the cross-rail 112 using a motor 154. In some implementations, the grasping mount 150 may be driven using belts, electromagnetism, or other driver. The motor 154 may be driven through command messages transmitted to the motor 154 from a controlling device. In some implementations, the controlling device may be included in the grasping mount 150.

By driving one or both of the rail motor 114 and the motor 154, the end effector 190 may be positioned over a location in the area 110 such as to retrieve the overpackage 200. To determine the location of the end effector 190 and the location of the overpackage 200, the grasping mount 150 may include a sensor 156. The sensor 156 may be an optical sensor (e.g., camera), acoustic sensor, or wireless signal sensor. The sensor 156 may be mounted on a shaft 152 of the grasping mount 150. It may be desirable to position the sensor 156 at a known distance from the ground. In this way, a sensing model can be constructed to provide an approximate location of the sensor 156 in relation to the detected information.

The shaft 152 may house electronics such as a processor to control the sensor 156 and receive data detected by the sensor 156, a wireless or wired transceiver to communicate detected data or control messages, and a power source to provide power to the grasping mount 150 and the elements included therein. The shaft 152 may include a winding mechanism to extend or retract a tether 160. Examples of the winding mechanism include a winch or a pulley which may be adjusted to control the length of the tether 160 extended from the shaft 152. The tether 160 may be flexible but having a test weight sufficient to hold an object enclosed in the self-identifying overpackage. One end of the tether 160 may be coupled to the winding mechanism within the shaft 152. The other end of the tether 160 may be coupled to the end effector 190.

The end effector 190 may be lowered or raised to interact with the overpackage. The end effector 190 may be lowered or raised using the winding mechanism. The end effector 190 may include components that can be activated to detect or couple with the overpackage 200. For example, a set of flanges may be included in the end effector 190 to mechanically secure a portion of the overpackage 200 to the end effector 190 by pivoting about an outer body of the end effector 190. The end effector 190 may communicate with the processor or other controlling device such as that included in the grasping mount 150. In some implementations, the tether 160 may be a braided tether including a data communication path to the processor included in the shaft 152. In some implementations, the end effector 190 may include a wireless communication device such as a BLUETOOTH™ transceiver to communicate with the controlling device. Between the tether 160, the rail motor, and the motor, the end effector 190 may be moved in three dimensions within the area 110.

As the sensor 156 and the end effector 190 approach the overpackage 200, the grasping mount 150 and/or the end effector 190 may be adjusted to position the end effector 190 at a pick point 220 or other surface of the overpackage 200 with which the end effector 190 may engage. The pick point 220 may be coupled to an envelope 210 which forms an inner recess to contain the object. The coupling between the pick point 220 and the envelope 210 may be formed by a tether 240. The tether 240 may be a flexible tether but having a test weight sufficient to hold an object enclosed in the overpackage 200.

The robotic retrieval system 100 of FIG. 1 shows the end effector 190 in a pincer configuration. A set of flanges may be closed around the pick point 220 to attach the overpackage 200 to the end effector 190. In some implementations, the end effector 190 may use an alternative structure to couple with the overpackage 200. For example, suction may be used to attach the end effector 190 to the overpackage 200. In such implementations, the tether 160 may include a hollow tube coupled with a vacuum system to provide a vacuum force to engage with the overpackage 200. As shown in the robotic retrieval system 100, the end effector 190 may be moved through the area 110 via a gantry. In some implementations, the end effector 190 may be mounted to a robotic arm, mobile drive unit, or other autonomous actor with mechanisms to position the end effector 190 in a two or three-dimensional space. The structure used by the end effector 190 to couple with the overpackage may be referenced using an end effector type. The end effector type may be encoded on the end effector 190 using a scannable identifier such as a QR code, alphanumeric characters, color, a wireless transmission, or other detectable indicator.

Figure 2:
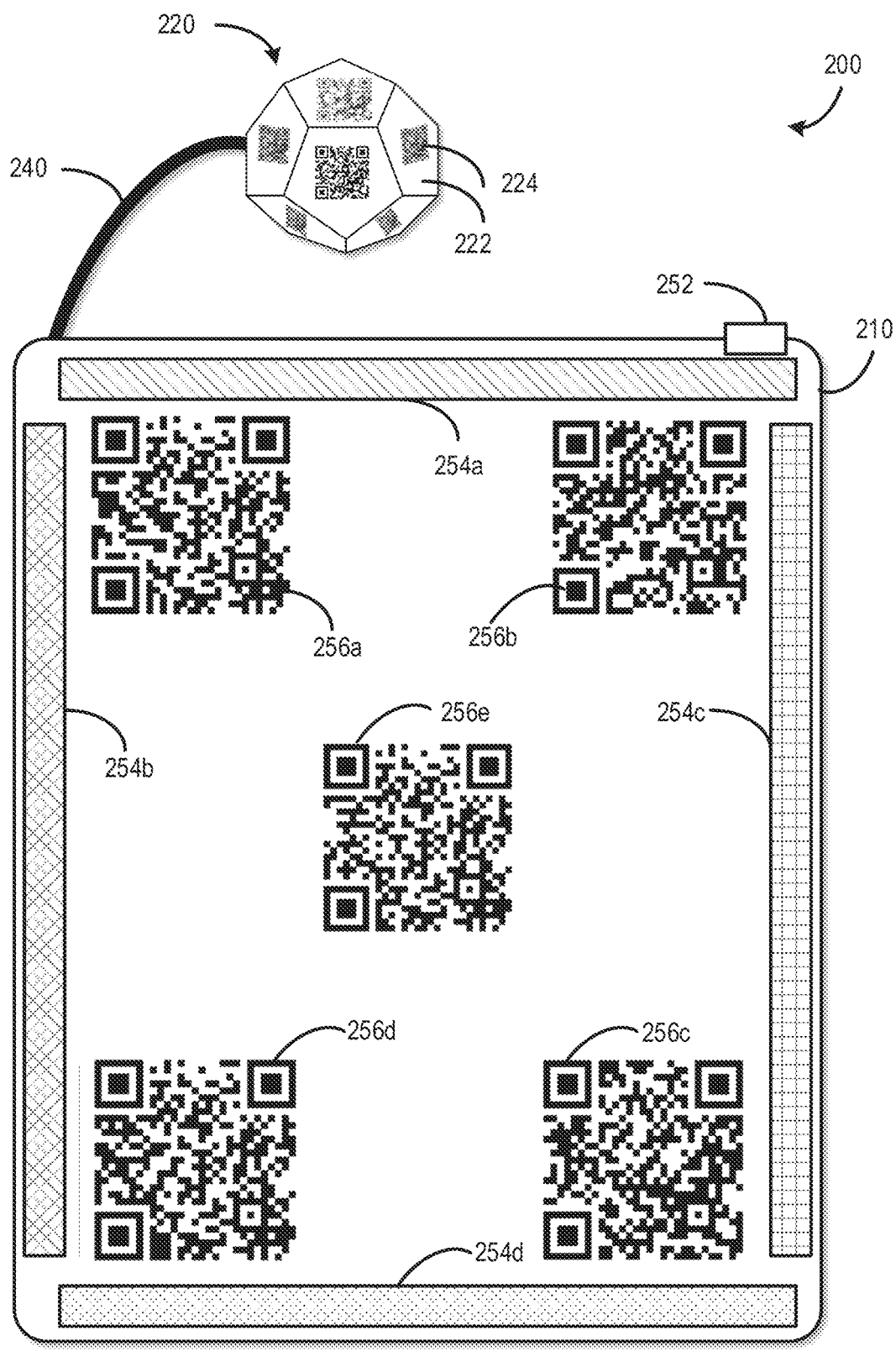
FIG. 2 is a diagram showing an illustrative self-identifying overpackage with a handle.

FIG. 2 is a diagram showing an illustrative self-identifying overpackage with a handle. The overpackage 200 may include scannable identifiers to self-identify the overpackage 200 as well as provide information about the scannable identifier such as the scannable identifier's location on the overpackage 200, a type of scannable identifier, or size of the scannable identifier. The scannable identifiers may be affixed, printed, integrally woven, or otherwise placed on or in an outer surface of the overpackage 200 such the scannable identifiers may be detected by the sensor 156. The type of scannable identifier may help guide a robotic actor to the pick point 220 which may serve as a handle for attaching the end effector 190 to the overpackage 200. Identifier types that may be included on the overpackage 200 include location identifiers, pick point identifiers, or stowage point identifiers. For a given identifier type, additional parameters may be encoded to further specify a property of the scannable identifier or the overpackage 200. For example, if the identifier type indicates that the scannable identifier is a pick point identifier, a grasp type may be indicated (e.g., suction, pincer, magnetic, hook).

A zipper or other sealing structure 252 may be included on the envelope 210. The sealing structure 252 may be released to open the area within the envelope 210 to receive an object. To help ensure the object remains within the envelope 210, the sealing structure 252 may be secured.

Identifiers may be placed on the pick point 220. The pick point 220 may be formed from a three-dimensional geometric shape. As shown in FIG. 2A, the pick point 220 includes twelve pentagon shaped faces. A face 222 may include a scannable pick point identifier 224. The pick point identifier 224 may be detected by the sensor of the end effector 190 to identify the pick point 220 as a structure that can be used to retrieve the overpackage 200. For example, an image may be captured which shows the pick point identifier 224. Based on the position of the end effector 190 when the image was captured, a relative location of the pick point identifier 224 may be determined. The relative location may be used to move the end effector to position the grasping head near the pick point 220. The pick point identifier 224 may encode the unique identifier for the overpackage 200. Once the sensor 156 scans the pick point identifier 224 and the pick point identifier 224 is decoded such as by the controlling device, the unique identifier for the overpackage 200 may be compared with the identifier associated with the object requested for retrieval. For example, a data store may associate overpackage identifiers with object identifiers. When a request for an object is received by the robotic retrieval system, an overpackage associated with the object identifier may be selected from the data store and requested for retrieval.

The tether 240 may include encoded information identifying the tether 240 as the connective path between the pick point 220 and the envelope 210. In some implementations, the encoding may be based on color. For example, the tether 240 may be provided an identifiable visual property such as color or color pattern (e.g., different color fabrics woven to create a distinctive appearance). When a sensor such as the sensor included on the end effector captures an image including the overpackage 200, the color or pattern may be detected and used to locate the tether 240.

Color or patterns may also be used to orient the end effector relative to the overpackage. For example, orientation identifiers 254a, 254b, 254c, and 254d may be included on the envelope 210. Each orientation identifier may be associated with a specific color or pattern that is, in turn, associated with a position of the envelope 210. For example, the orientation identifier 254 may be the orientation identifier located at the top of the envelope 210 nearest to the sealing structure 252. Using compass directions for ease of explanation, orientation identifier 254a may point to north while the remaining orientation identifiers provide the remaining cardinal directions (east corresponding to 254c, west corresponding to 254d, and south corresponding to 254b). In some implementations, the envelope 210 may be color coded or patterned to provide information about the overpackage 200.

The envelope 210 may include additional scannable identifiers such as scannable identifiers 256a, 256b, 256c, 256d, and 256e. Unlike the orientation identifiers, the scannable identifiers may not require a prior understanding of the pattern or color of the identifier to determine location information. The scannable identifier 256a, for example, may, like the pick point identifier 224, self-identify through information encoded by the scannable identifier 256a. The orientation identifiers, scannable identifiers, pick point identifier, or other fiduciary markers on the overpackage 200 may be generally referred to as nodes. A node may indicate an end effector type that can be used to engage the overpackage 200. Table 1 provides an example structure of the information that may be encoded by an identifier included on an overpackage. The fields may be marked with field identifiers or represented in a fixed field format.

TABLE 1

| Field | Description |
| --- | --- |
| ID | Unique identifier for the overpackage |
| Type | Type of identifier (e.g., reference location, pick point, stow point, etc.) |
| Dimensions | Height and width of the identifier |
| Type Parameters | For specific types of identifiers, additional parameters may be included. For example, for a pick point identifier, the parameters may include: a mode of grasping, dimensions of the pick point, geometric design of the pick point, etc. For reference location identifiers, the additional parameter may encode the coordinates of the identifier relative to the surface of the envelope. The coordinate system may be oriented such that the upper left corner of the envelope corresponds to position (0,0). |

In some implementations, the identifier may indicate the unique identifier for the overpackage 200, a node identifier indicating for the overpackage 200 what the specific node is (e.g., orientation identifier, scannable identifier, pick point identifier), and the size of the node. Using the unique identifier for the overpackage 200, an overpackage model may be obtained. The overpackage model provides a geometric model of the overpackage and structures included therein (e.g., the pick point). The node identifier allows selection of a specific point within the geometric model. For example, if a camera detects the scannable identifier 254a, the robotic retrieval system 100 may determine that the scannable identifier 254a is located on a first surface of the overpackage 200 in the same corner of the overpackage 200 as the tether 240. This allows the robotic retrieval system 100 to orient the end effector 190 and generate an estimated location of the pick point 220. For example, a distance from the scannable identifier 254a to the pick point 220 may be calculated using the overpackage model. The distance provides a general vicinity in which the pick point 220 may be located.

In some implementations, the tether 240 may be formed of a semi-rigid material and/or may include a stiffener (e.g., sheathing or core). The stiffener or semi-rigid material may restrain flexing of the flexible tether to a predetermined angle relative to the envelope to restrict the possible positions of the pick point 220. By restricting the possible positions, the area in which the pick point 220 may be located may also be restricted. This helps reduce the search space for an end effector seeking a pick point to a predictable volumetric location and improves the accuracy of the estimated location for a pick point. For example, the robotic retrieval system may receive a model of the overpackage 200. The model may indicate relative locations of identifiers and the pick point 220. The robotic retrieval system may determine a location of the end effector 190 based at least in part on the model and the scannable identifier (e.g., 254*a*). Having localized the end effector 190 with relation to the overpackage 200, the robotic retrieval system may also estimate a three-dimensional location of the pick point 220 based at least in part the location of the end effector 190 and the model. The robotic retrieval system may then activate a driver to adjust a position of the end effector 190 from the location to the estimated three-dimensional location.

Figure 3:
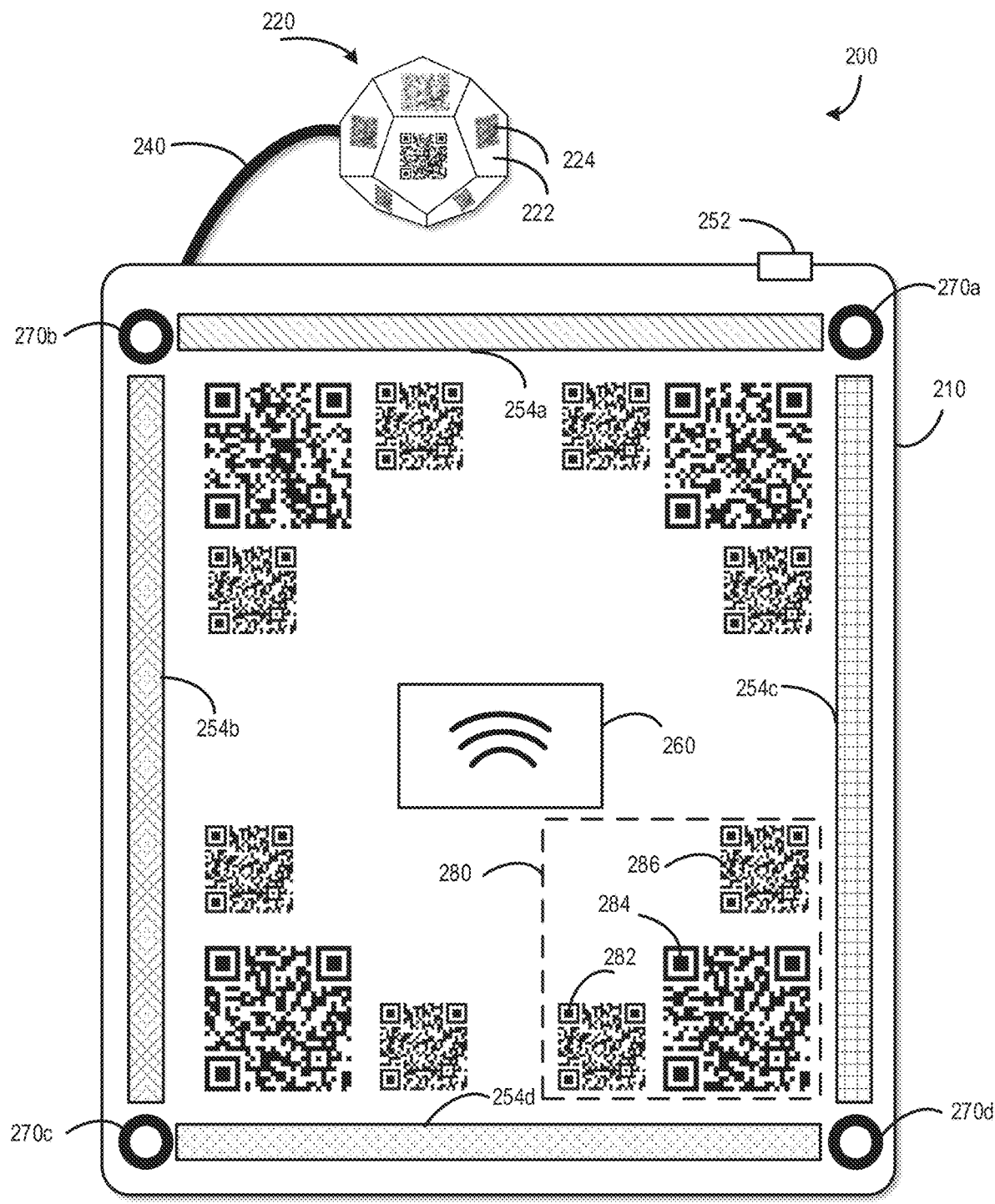
FIG. 3 is a diagram showing another illustrative self-identifying overpackage with grommets and a wireless identifier.

FIG. 3 is a diagram showing another illustrative self-identifying overpackage with grommets and a wireless identifier. The overpackage 200 is similar to the overpackage 200 shown in FIG. 2 but uses different identifiers. For example, in FIG. 2, the identifiers described were mainly optical based identifiers. In the example shown in FIG. 3, a wireless identifier 260 is included. The wireless identifier 260 may be scanned using a wireless technology such as radio frequency identifier (RFID) protocol or near field communication (NFC) protocol. When stimulated by a wireless signal, the wireless identifier 260 may transmit a response signal including self-identifying information similar to the information encoded by the optical identifiers. The wireless signal may be transmitted by the sensor 156 associated with the end effector 190.

The overpackage 200 shown in FIG. 3 includes grommets 270*a*, 270*b*, 270*c*, and 270*d*. A grommet, such as the grommet 270*a*, may include a solid ring with a hollow center through which a hook or other gripping device may pass. The grommet may be an alternate handle used to pick up the overpackage 200. In some implementations, the grommet may be used to stow the overpackage 200. For example, the overpackage 200 may be moved to a delivery vehicle for transport to a destination (e.g., customer who ordered the object included in the overpackage 200). The delivery vehicle may include stowage racks including hooks upon which the overpackage 200 may be hung using, for example, the grommet 270*b*.

Grommets and geometric pick points are two examples of handles that the end effector 190 may use to couple with the overpackage 200. In some implementations, an identifier may indicate a suction point or a magnetic pick point. Because these types of handles may be formed within the envelope 210 (e.g., magnetic insert or plastic sheathing), it may be desirable to include identifiers indicating the location of such handles. For example, part of the envelope 210 may include a plate 280 which can be coupled to using magnetism or a pressure differential (e.g., vacuum). The plate 280 may be formed from a non-porous material such as plastic or a plastic resin such as polyvinyl chloride acetate (PVCA). In such implementations, an identifier 284 may encode information such as the location of the plate 280 relative to the identifier 284 or the type of plate (e.g., magnetic or vacuum attach). In this way, the end effector 190 may determine where and how to engage the plate 280.

The overpackage 200 shown in FIG. 3 also illustrates how additional scannable identifiers may be included, such as identifiers 282 and 286. The additional identifiers may be included to provide additional location and identification information to the end effector 190. In some implementations, the number and arrangement of the identifiers may be based on the sensor 156 associated with the end effector 190. For example, if the sensor 156 has a detector which can scan, for example, a six-inch square area, it may be desirable to ensure that the distance between any two identifiers is less than six inches. In this way, any time the sensor 156 is activated, at least a portion of at least one identifier can be detected.

Though not shown in FIG. 2 or FIG. 3, the overpackage 200 may include electronic components that may be activated such as by a signal from the end effector 190 or other element of the robotic retrieval system 100. In such implementations, the overpackage 200 may include a power source that can be wirelessly charged such as through wireless conductive charging. For example, before an object is associated with the overpackage 200, the overpackage 200 may be stored in a location that receives wireless charging signals. The wireless charging signals may be received by the overpackage 200 and used to charge a battery or other power source. Implementations of the overpackage 200 which include a power source may be referred to as active overpackages while implementations that rely on external stimulation (e.g., vacuum, wireless signal (e.g., NFC or RFID) or optical reading) may be referred to as passive overpackages. In some implementations, an active overpackage may also include passive elements (e.g., optical or wireless scannable identifiers).

The embodiments shown in FIG. 2 and FIG. 3 show one side of the overpackage 200. In the chaos of a fulfillment center, not every overpackage may consistently present a single surface. In some implementations, the overpackage 200 may include additional nodes on other surfaces. For example, if the overpackage 200 is a cube or rectangle, nodes may be applied on all six surfaces of the overpackage 200.

Figure 4:
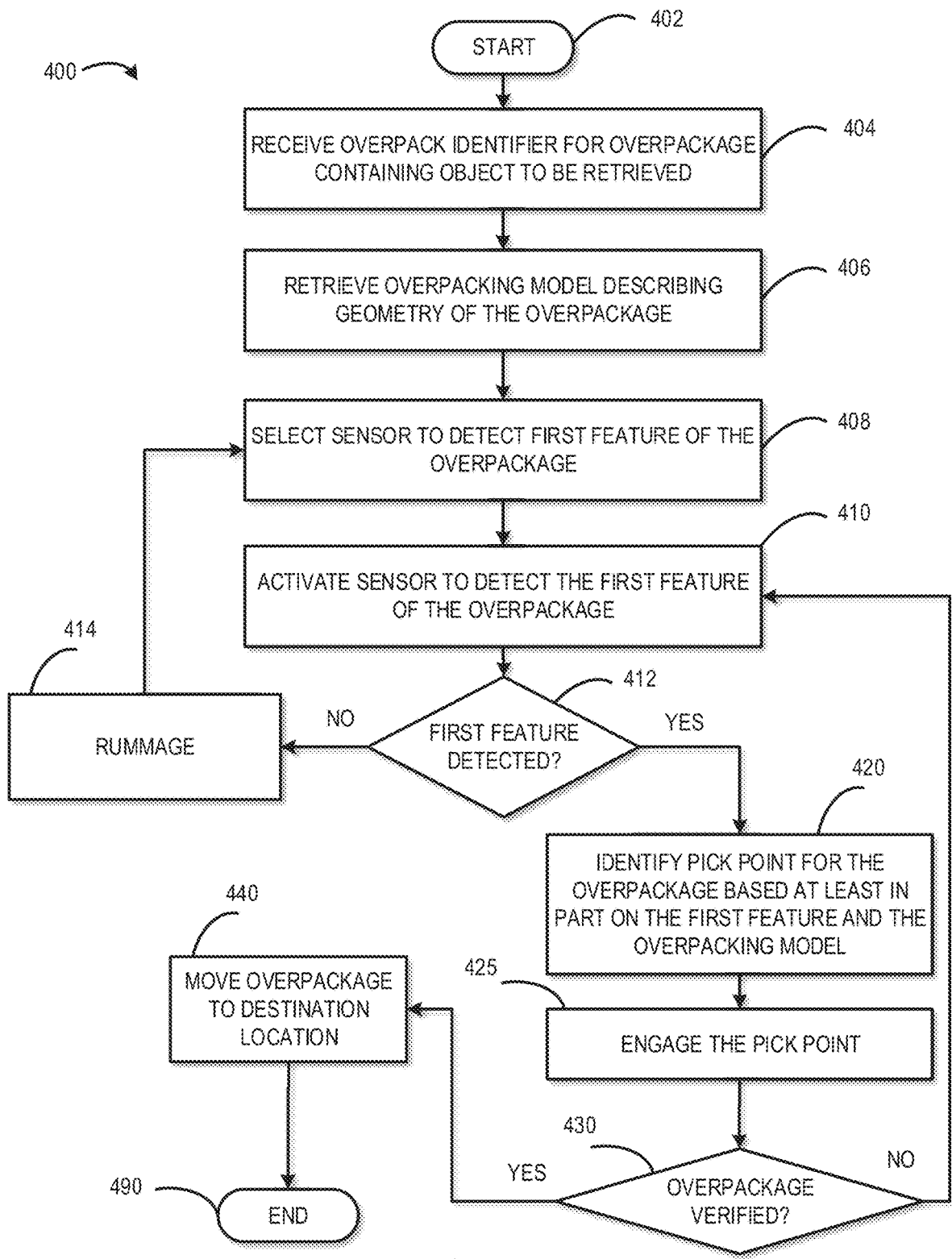
FIG. 4 is a flow diagram depicting an example method of retrieving an object included in a self-identifying overpackage.

FIG. 4 is a flow diagram depicting an example method of retrieving an object included in a self-identifying overpackage. The method 400 shown in FIG. 4 may be implemented in whole or in part by one or more of the devices shown such as the robotic retrieval system 100 of FIG. 1 or the computing device discussed in FIG. 6 below. The method 400 may be implemented by a controlling device coupled with the grasping mount 150 and elements thereof (e.g., the sensor 156, the end effector 190, the motor 154, etc.). The method 400 illustrates aspects of an example of how an object may be retrieved once placed within a self-identifying overpackage.

The method 400 begins at block 402 assuming that an object has been stowed within an overpackage. The overpackage is also assumed to be stored within a facility accessible by the robotic retrieval system. At block 404, the robotic retrieval system may receive an overpackage identifier for the overpackage containing the object to be retrieved. The overpackage identifier may be retrieved from a data storage device which associated overpackage identifiers with object identifiers. The retrieval request may be received from an order management system in response to a request from a user for the object.

At block 406, the robotic retrieval system may retrieve an overpackaging model describing the geometry of the overpackage including the object. The overpackaging model may indicate the location of the scannable identifiers to help guide an end effector to the self-identifying information. The overpackaging model may also indicate the location and types of available pick points included on the overpackaging. This may be useful in planning the retrieval because end effectors may have different grasping capabilities. For example, if the object is contained by an overpackage that does not include a pick point but rather only includes a suction handle, the end effector to retrieve the object should have suction capabilities.

At block 408, the robotic retrieval system may select a sensor to detect a first feature of the overpackage. The sensor may be the sensor associated with the end effector. The sensor may be a camera or other sensor within the facility. The first feature may be a feature that can be detected from a distance such as an AprilTag or wireless identifier. The selection at block 408 may be based on location information for the overpackage. For example, an inventory tracking system may store a current location for the overpackage. Using the current location information, a set of available sensors that can detect overpackages near the current location may be identified. From this set of available sensors, at least one can be selected to detect the first feature. In some implementations, the selection may be based on capability of the sensor. For example, if the set of available sensors include optical sensors, the sensor with the highest resolution or largest field of view may be selected. The sensor capability may also be used to select the sensor which is compatible with the first feature of the overpackage. For example, if the first feature is a wireless identifier, the robotic retrieval system may select a wireless signal sensor.

At block 410, the robotic retrieval system may activate the sensor to detect the first features of the overpackage. The activation may include transmitting a wireless signal to stimulate a wireless tag on the overpackage. The activation may include capturing images. In some implementations, the activation may include activating an emitter (e.g., sound, light, wireless transmitter) on the overpackage and capturing a series of images. For example, if the emitter is a light, the light may be detected by comparing an image captured when the light is activated and an image captured when the light is deactivated. In some implementations, the emitter may be activated to generate a detectable pattern of emissions encoding the first feature. The activation may be based on a signal received from the end effector or other element included in the robotic retrieval system. The first feature may include a node (e.g., scannable identifier) included on a surface of the overpackage encoding information about the overpackage and its geometry. In some implementations, the first feature may be a color, color pattern, or shape of the overpackage.

At block 412, a determination is made as to whether the first feature is detected. The determination may include image analysis of image data captured by the sensor. The image analysis may first determine whether an optical code is shown in the image. If shown the determination may then attempt to decode the optical code. The determination may include decoding a wireless signal received from a wireless tag. The first feature may include an identifier for the overpackage and location information for the first feature upon the overpackage.

If the determination at block 412 is negative, at block 414 the robotic retrieval system may initiate a rummage operation. The rummaging may include activating an end effector to move one or more overpackages at or near a location of the desired overpackage. For example, the overpackage may be stowed in a tote with several other overpackages. The other overpackages within the tote may block the sensor from detecting the first identifier of the desired overpackage. In such instances, moving the other overpackages may expose the overpackage of interest.

The rummaging at block 414 may include detecting scannable identifiers of other overpackages at or near the location of the desired overpackage. By analyzing which overpackages are detected, the robotic retrieval system may identify an overpackage to be moved as part of the rummaging operation. The selection of which overpackage to move may be based on a probability of increasing likelihood of exposing the overpackage of interest. For example, if an image of the tote into which an overpackage is to be stowed includes identifiers for a small overpackage and for a larger overpackage, it may be desirable to move the larger overpackage as part of the rummaging. The size of an overpackage may be assessed using unique overpackage identifiers for the overpackages detected in an image.

In some implementations, the rummaging at block 414 may include moving an overpackage to a buffer location. The buffer location may be a temporary stowage location for receiving overpackages that may be obscuring the desired overpackage. The movement of an obscuring overpackage may be achieved using a method similar to the method 400 by issuing a request to move the obscuring overpackage to the buffer location.

In some implementations, the rummaging may include activating other robotic entities within the facility. For example, if the tote is retrieved from a location using a mobile drive unit, a command message may be provided to cause the mobile drive unit to shake the tote such as by moving forward and backward or tilting the tote. Once the rummaging is completed, the method 400 may return to block 408 as described.

Returning to block 412, if the first feature is detected, at block 420, a pick point for the overpackage may be identified. The pick point may be identified based at least in part on the first feature and the overpackaging model. The pick point may be identified in a step-wise fashion by interpreting a current identifier, determining a destination location for a next identifier, moving the end effector to the destination, confirming the destination by detecting the next identifier, and repeating the process until arriving at the pick point. In some implementations, a detection path may be generated for the overpackage based on the first feature and the overpackaging model. For example, once the first feature is identified, it may provide the necessary location and orientation information to identify the location of the pick point based on the geometry defined in the overpackaging model. The robotic retrieval system may generate the detection path for the end effector to follow to ultimately arrive at the pick point (e.g., a handle).

Figure 5:
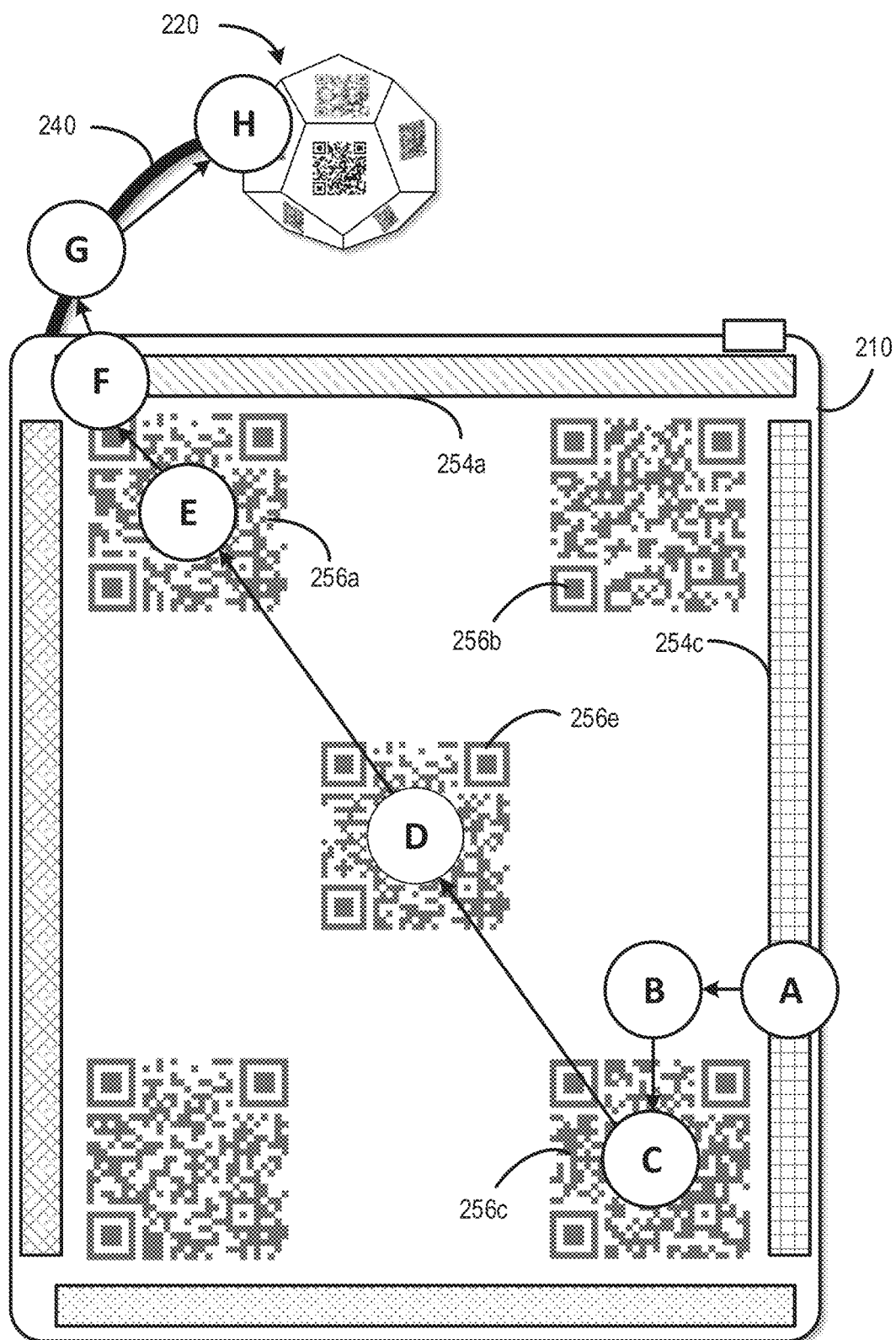
FIG. 5 is a diagram showing an example detection path for an end effector to locate a handle on an overpackage.

FIG. 5 is a diagram showing an example detection path for an end effector to locate a handle on an overpackage. In FIG. 5, the steps included in the detection path are identified using sequential lettering. In FIG. 5, the first feature detected at point A is the orientation identifier 254*c*. The orientation identifier 254*c* may indicate that the orientation identifier 254*c* is located at the right side of the envelope 210 such as by detecting a visual property of the orientation identifier 254*c* such as a color or color pattern (e.g., gradient or texture) of the orientation identifier 254*c*.

A motor or other driver may be engaged to move the end effector to point B. Point B may be identified based on the overpackaging model which may indicate the presence of the scannable identifier 256*c*. Absent further information indicating a relative distance to the scannable identifier 256*c*, the end effector may be close to one of scannable identifier 256*b* or scannable identifier 256*c*. Using the overpackaging model, the end effector may select a direction and begin to move in the selected direction. The movement may be guided by further identifiers if available, such as those shown in FIG. 3. In FIG. 5 the overpackage is designed such that the end effector will eventually detect one of the scannable identifier 256*b* or 256*c*.

At point C, the end effector may determine a specific location on the envelope 210. At point C, the end effector may also determine the unique identifier for the overpackage as encoded in the scannable identifier 256c. The overpackaging model may indicate that the next scannable identifier 256e is located at a fixed distance from the scannable identifier 256c. In some implementations, the distance may be specified along with a relative angle to guide the end effector to point D. Upon arrive at point D, the end effector may again activate the sensor to confirm the location of the end effector before moving again to point E. At point E, the end effector may then seek point F based on the overpackage model indicating the location of orientation identifier 254a. The orientation identifier 254a may be detected by comparing images or edge detection. For example, the envelope 210 may be a uniform color upon which the identifiers and orientation identifiers may be placed.

The relative position of the orientation identifier 254a to the tether 240 may be specified in the overpackaging model. In some implementations, the tether 240 may include a color or other detectable pattern to allow the end effector to identify the tether 240. From point G, the end effector may follow the tether 240 to arrive at the pick point which, in the implementation shown in FIG. 5, is the pick point 220. As discussed with the other identifier, the pick point 220 may include identifiers which may be scanned and decoded to ensure the proper overpackage is to be retrieved using the appropriate handle.

The overpackage 200 shown in FIG. 5 is presented in a relatively flat orientation. In some implementations, the overpackage 200 may be oriented at an angle relative to the ground. In such implementations, the identifiers may be used to identify lateral and depth information for locating the pick point 220. For example, an image showing the overpackage 200 may include scannable identifier 256c and scannable identifier 256e. Because the overpackage model indicates the geometry of the overpackage 200, the distance between the scannable identifier 256c and the scannable identifier 256e (when the overpackage 200 is in a flat orientation) may be determined. The distance in a flat orientation may be compared to a second distance between the scannable identifier 256c and the scannable identifier 256e shown in the image. By comparing the second distance to the distance in a flat orientation, the z-axis orientation of the overpackage 200 may be determined. In this way, a three-dimensional estimate of the location of the pick point 220 for the overpackage 200 in its current orientation may be generated.

Although FIG. 5 is described as a step wise detection path, in some implementations, the path may be planned by the robotic retrieval system to expedite discovery of the overpackage and a suitable handle for robotic retrieval. In some implementations, once the scannable identifier 256c is detected at point A, it may be possible to generate a move command to adjust the end effector directly to point A or G.

Returning to FIG. 4, the identification of a pick point at block 420 may include selecting between one or more pick points available on the overpackage 200. For example, the overpackage 200 may include a suction plate and a geometric handle as two possible pick points. The overpackage model may include information indicating a desirability for the pick points. In this way, the robotic retrieval system may select the pick point that will provide the highest confidence of engagement. The confidence of engagement includes a likelihood that the pick point will be identified and coupled to the end effector 190. For example, if two geometric handles of different sizes are included in an overpackage, it is more likely that the larger handle will be discovered since it occupies more space than the smaller handle.

In embodiments where multiple pick points are available, the selection may be based at least in part on information for other overpackages at or near the overpackage of interest. For example, if an overpackage containing a heavy item is partially covering the desired overpackage, it may be desirable to select a pick point that can tolerate more weight in anticipation of having to pull the desired overpackage out from underneath the overpackage containing the heavy item.

At block 425, the end effector may be located at the pick point for the desired overpackage. From this position, the end effector may be activated to engage the pick point. In some implementations, the end effector may include a receiving body to lift the pick point 220 toward a grasping head included in the end effector. The receiving body may be activated with located at a distance from the pick point 220 that corresponds to an attraction threshold. The attraction threshold may define the distance from which activation of the receiving body will attract the pick point 220.

The receiving body may couple with the pick point 220 such as using magnetism or suction. In some implementations, the pick point 220 may be formed from a magnetically attractive material or include a magnetically attractive element such as a metallic ball bearing. A detector may determine that the receiving body has coupled with the pick point 220. This event may cause a set of flanges supported by an outer body of the end effector 190 to each pivot about the outer body. Each flange may define a tip that, upon pivoting of the respective flange, secures the pick point 220. The set of flanges represent an example mechanical gasping mechanism to at least partially surround the pick point 220 such that the end effector may lift the overpackage 200 to a destination location. In some implementations, the mechanical grasping mechanism may include dilating ring that, in an open position has a diameter sufficiently wide to allow the pick point 220 to pass through the ring. Once through the ring and engaged with the receiving body, the ring may close to a diameter sufficient to prevent the pick point 220 from passing through the ring.

At block 430, the retrieval system may determine whether the overpackage 200 requested at block 404 has been engaged. The determination may be based on the state of the end effector 190. For example, the position of the flanges may be detected (e.g., in a closed position). As another example, the determination may be based on information received from the sensor 156. The sensor 156 may capture an image of the overpackage 200 engaged with the end effector 190. The image may be analyzed to detect an identifier on the overpackage 200 which may be compared to the overpackage identifier received at block 404. In some implementations, the image may be analyzed to determine whether the overpackage 200 has changed positions in a manner consistent with engagement. In some implementations, another sensor of the robotic retrieval system may capture an image of the end effector 190. The image may show the engagement with pick point 220 or the overpackage 200. In some implementations, the end effector 190 or grasping mount 150 may include a tension sensor (not shown). As the end effector 190 is retracted to lift the overpackage 200, an amount of force needed to lift the end effector 190 along with the overpackage 200 may be detected. If the force is below an expected amount, then the determination at block 430 may be negative. The expected amount may be generated based on a system threshold indicating a maximum weight that can be lifted by the system. The expected amount may be generated based on the specific object associated with the overpackage 200. For example, the expected amount may be generated based at least in part on a weight of object, a weight of the end effector 190, and a tolerance. The tolerance may identify a reasonable difference between the detected weight and the expected weight. Either by force or by other detected information, if the determination at block 430 is negative, the method 400 may return to block 410 to perform another attempt at locating the object and pick point.

If engagement is detected at block 430, at block 440, the object may be moved to a destination location. Moving the object may include activating one or more motor on the gantry to adjust the location of the end effector 190 engaged with the overpackage 200 containing the object. Once the overpackage 200 is in the grasp of the end effector 190 (e.g., by suction or robotic handle), the robotic retrieval system may move the overpackage 200 to the destination location for further processing. The processing may include picking objects for an order, stowing objects in a location, or sorting objects being added to the fulfillment center. In some cases, these processes may be performed without human touch. In some implementations, the destination location may be a container or other conveyor near the gantry. The container or other conveyor may move the overpackage 200 toward the ultimate destination. The method 400 ends at block 490.

Figure 6:
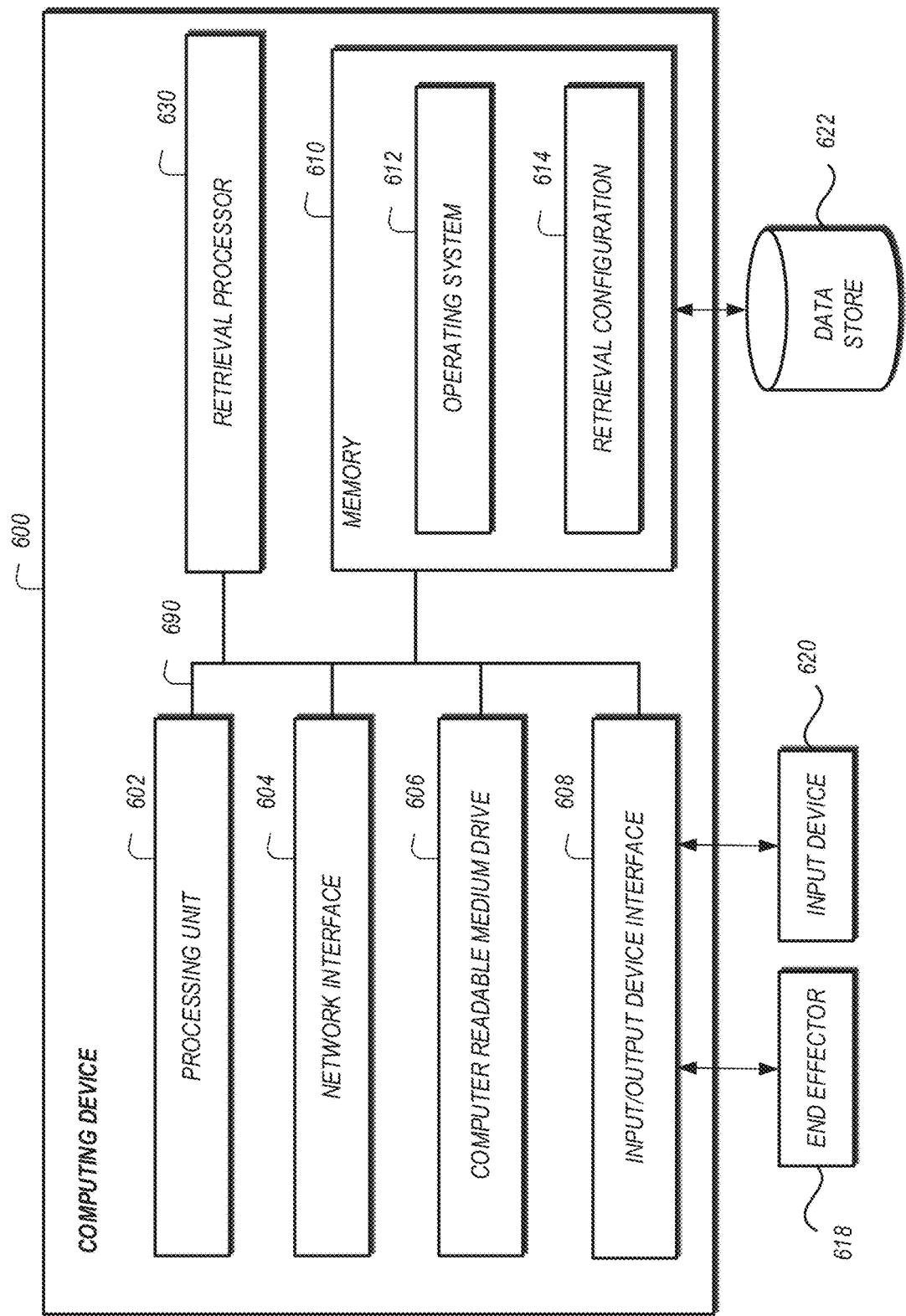
FIG. 6 is a block diagram of an illustrative computing device that may implement one or more of the overpackage based retrieval features described.

FIG. 6 is a block diagram of an illustrative computing device that may implement one or more of the overpackage based retrieval features described. The computing device 600 may implement the method shown in of FIG. 4 or the detection path shown in FIG. 5. The computing device 600 can be a server, a communication device included in an end effector 618, or other computing device. The computing device 600 can comprise a processing unit 602, a retrieval processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610. The processing unit 602 may communicate with the end effector 618 via the input/output device interface 608. The input/output device interface 608 can also accept input from the input/output device 620, such as a keyboard, mouse, digital pen, microphone, mass storage device or sensing devices used for robotic retrieval such as an optical sensor, a magnetic sensor, a wireless signal detector, a global positioning service device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a retrieval configuration 614. The retrieval configuration 614 may include the thresholds, tolerances, authentication information (e.g., encryption keys, tokens, device identifiers, etc.), end effector capability information, or other predetermined or configurable values described herein. The retrieval configuration 614 may store specific values for a given configuration. The retrieval configuration 614 may, in some implementations, store information for obtaining values for a given configuration element. For example, a registry of overpackaging models may be specified as a network location (e.g., URL) in conjunction with username and password information to access the network location to obtain or verify information associated with a an overpackage or property thereof (e.g., capabilities, dimensions, overpackaging mode, current location, etc.). The retrieval configuration 614 may be used by the retrieval processor 630 to implement one or more of the aspects described herein. In some implementations, the retrieval processor 630 may include specific computer executable instructions that cause the computing device 600 to perform one or more of the robotic retrieval features described.

The memory 610 may also include or communicate with one or more auxiliary data stores, such as data store 622. The data store 622 may electronically store data regarding the object, the overpackage, geometry models for overpackages, etc.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 600 may not be coupled to the end effector 618 or the input device 620. In some embodiments, two or more computing devices 600 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A retrieval device included in the robotic retrieval system can be or include a microprocessor, but in the alternative, the robotic retrieval device can be or include a controller, microcontroller, or state machine, combinations of the same, or the like configured to efficiently process and present event data for delivery of an object. A robotic retrieval device can include electrical circuitry configured to process computer-executable instructions. Although described herein primarily with respect to digital technology, a robotic retrieval device may also include primarily analog components. For example, some or all of the retrieval algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a robotic retrieval device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the robotic retrieval device such that the robotic retrieval device can read information from, and write information to, the storage medium. In the alternative, the storage medium can be integral to the robotic retrieval device. The robotic retrieval device and the storage medium can reside in an application specific integrated circuit (ASIC). The ASIC can reside in an access device or other robotic retrieval device. In the alternative, the robotic retrieval device and the storage medium can reside as discrete components in an electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an object, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described objects. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine-readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically.

Thus, although the various schematics shown in the Figures depict example arrangements of elements and components, additional intervening elements, devices, features, or components may be present in an actual embodiment (assuming that the functionality of the depicted circuits is not adversely affected). While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A robotic retrieval system comprising:
    an overpackage including:
        (i) an envelope that defines an inner recess configured to contain an object, wherein an outer surface of the envelope includes a scannable identifier identifying the overpackage and relative location of the scannable identifier on the overpackage;
        (ii) a pick point including a scannable pick point identifier identifying the overpackage and a grasp type for attaching to the pick point; and
    a sensor configured to detect the scannable identifier and the scannable pick point identifier;
    an end effector configured to engage the pick point based at least in part on the grasp type for attaching to the pick point detected by the sensor from the scannable pick point identifier; and
    a motor configured to position the end effector based at least on part on the relative location detected by the sensor from the scannable identifier.

2. The robotic retrieval system of claim 1, wherein the envelope includes an orientation identifier configured to indicate the orientation of the overpackage.

3. The robotic retrieval system of claim 1, wherein the scannable identifier comprises a passive wireless circuit configured to receive a wireless signal and generate a response signal including: (i) a unique identifier for the overpackage, and (ii) the relative location for the scannable identifier.

4. The robotic retrieval system of claim 1, wherein the pick point includes a magnetically attractive material, and wherein the grasp type identified by the scannable pick point identifier is magnetic.

5. The robotic retrieval system of claim 1, wherein the overpackage includes a flexible tether having a first end coupled to the envelope and a second end coupled to the pick point.

6. An apparatus comprising:
    an envelope that defines an inner recess configured to contain an object, wherein an outer surface of the envelope includes a scannable identifier identifying: (i) the apparatus and (ii) relative location of the scannable identifier on the apparatus; and
    a pick point physically connected to the envelope, wherein the pick point includes a scannable pick point identifier identifying: (i) the apparatus and (ii) a grasp type for attaching to the pick point.

7. The apparatus of claim 6, wherein the envelope is at least partially formed from a transparent material such that at least a portion of the object contained by the apparatus is visible.

8. The apparatus of claim 6, wherein the scannable identifier comprises an optical code encoding: (i) a unique identifier for the apparatus and (ii) the relative location of the scannable identifier.

9. The apparatus of claim 6, wherein the scannable identifier comprises a passive wireless circuit configured to:
    a receive wireless signal; and
    generate a response signal including: (i) a unique identifier for the apparatus and (ii) the relative location of the scannable identifier.

10. The apparatus of claim 6, wherein the envelope comprises an orientation identifier, wherein the orientation identifier indicates the orientation of the apparatus based on a visual property of the orientation identifier.

11. The apparatus of claim 6, wherein the pick point includes a magnetically attractive material, and wherein the grasp type identified by the scannable pick point identifier is magnetic.

12. The apparatus of claim 6, wherein the pick point is physically connected to the envelope by a flexible tether having a first end coupled to the envelope and a second end coupled to the pick point.

13. The apparatus of claim 12, wherein the flexible tether comprises a stiffener, wherein the stiffener restrains flexing of the flexible tether to a predetermined angle relative to the envelope.

14. The apparatus of claim 6, further comprising a grommet having a hollow center by which the apparatus may be grasped or held.

15. The apparatus of claim 14, wherein scannable identifier indicates a location of the grommet on the envelope.

16. The apparatus of claim 6, wherein the pick point includes a non-porous material, and wherein the grasp type identified by the scannable pick point identifier is suction.

17. A method comprising:
    under control of one or more processing devices:
        receiving an object to be moved from a first physical location to a second physical location;
        detecting a first identifier to uniquely identify the object;
        detecting a second identifier to uniquely identify an overpackage for storing the object;
        depositing the object into the overpackage;
        transmitting a message to an end effector, the message including the second identifier for the overpackage and an identifier for the second physical location;
        identifying the overpackage based at least in part on a scannable identifier upon the overpackage;
        engaging a pick point of the overpackage based at least in part on the scannable identifier; and
        moving the overpackage to the second physical location.

18. The method of claim 17, further comprising:
    determining that a distance between the end effector and the pick point corresponds to an attraction threshold;
    detecting a pick point identifier included on the pick point, wherein the pick point identifier indicates the identifier for the overpackage and a grasp type for attaching to the pick point; and
    activating a receiving body included in the end effector to attract the pick point to the end effector, wherein the receiving body is activated based at least in part on the grasp type detected.

19. The method of claim 17, further comprising:
    receiving a model of the overpackage, wherein the model indicates relative locations of identifiers and the pick point;

generating a path to move the end effector from a first location associated with the scannable identifier to the pick point based at least in part on the model and the first location; and activating a motor to adjust a position of the end effector from the first location to the pick point based at least in part according to the path.

20. The method of claim 17, further comprising:

receiving a model of the overpackage, wherein the model indicates a relative location of a scannable identifier and the pick point;

determining a location of the end effector based at least in part on the model and the scannable identifier;

estimating a location of the pick point based at least in part the location of the end effector and the model; and activating a driver to adjust a position of the end effector from the location of the end effector to the location of the pick point.

\* \* \* \* \*

UNITED STATES PATENT AND TRADEMARK OFFICE
CERTIFICATE OF CORRECTION

PATENT NO. : 11,200,531 B1
APPLICATION NO. : 15/978762
DATED : December 14, 2021
INVENTOR(S) : Tye Brady, John Longtine and Timothy Stallman Page 1 of 1

It is certified that error appears in the above-identified patent and that said Letters Patent is hereby corrected as shown below:

In the Specification

In Column 1, Line 10, delete "RETREIVAL" and insert --RETRIEVAL--.

In Column 16, Line 7, delete "a an" and insert --an--.

Signed and Sealed this
Tenth Day of May, 2022

Katherine Kelly Vidal
*Director of the United States Patent and Trademark Office*